US012595995B2

(12) United States Patent
Liang et al.

(10) Patent No.: US 12,595,995 B2
(45) Date of Patent: Apr. 7, 2026

(54) ELECTRONIC SCALE RULER AND VERNIER CALIPER, AND USE METHOD THEREOF

(71) Applicant: Guangzhou Houzuo Technology Co., Ltd., Guangzhou (CN)

(72) Inventors: Tiancheng Liang, Guangzhou (CN); Meilin Zhu, Guangzhou (CN); Xinggang Luo, Guangzhou (CN)

(73) Assignee: Guangzhou Houzuo Technology Co., Ltd., Guangzhou (CN)

( * ) Notice: Subject to any disclaimer, the term of this patent is extended or adjusted under 35 U.S.C. 154(b) by 427 days.

(21) Appl. No.: 18/458,018

(22) Filed: Aug. 29, 2023

(65) Prior Publication Data

US 2024/0191982 A1 Jun. 13, 2024

(30) Foreign Application Priority Data

Dec. 7, 2022 (CN) .......................... 202211578854.9

(51) Int. Cl.
| | |
|---|---|
| *G01B 3/20* | (2006.01) |
| *G01B 3/24* | (2006.01) |
| *G01D 5/245* | (2006.01) |
| *G01D 13/26* | (2006.01) |

(52) U.S. Cl.
CPC .............. *G01B 3/205* (2013.01); *G01B 3/24* (2013.01); *G01D 5/2458* (2013.01); *G01D 13/265* (2013.01)

(58) Field of Classification Search
CPC ........ G01B 3/205; G01B 3/24; G01D 5/2458; G01D 13/265
See application file for complete search history.

(56) References Cited

U.S. PATENT DOCUMENTS

| | | | | |
|---|---|---|---|---|
| 4,158,229 A | * | 6/1979 | Woo, Jr. ................. | G01B 3/004 33/700 |
| 6,279,248 B1 | * | 8/2001 | Walters ................ | G01D 5/2451 33/784 |
| 6,834,439 B2 | * | 12/2004 | Matsumiya ............ | B82Y 30/00 33/784 |
| 8,826,557 B2 | * | 9/2014 | Yang ........................ | G01B 3/20 33/808 |
| 2008/0052942 A1 | * | 3/2008 | Kawatoko ............ | G01D 3/0365 33/702 |
| 2012/0203504 A1 | * | 8/2012 | Jordil ..................... | G08C 17/02 702/162 |
| 2013/0227854 A1 | * | 9/2013 | Zhang .................... | G01B 3/002 33/809 |
| 2024/0191982 A1 | * | 6/2024 | Liang ................... | G01D 5/2458 |

* cited by examiner

*Primary Examiner* — Yaritza Guadalupe-McCall
(74) *Attorney, Agent, or Firm* — AEON Law, PLLC; Adam L.K. Philipp; Charlotte E. Holoubek

(57) ABSTRACT

Disclosed is an electronic scale ruler, having a scale ruler main body, a main control board, an input, a display screen, a light source, a vernier base, and a distance conversion assembly. The scale ruler main body has an outer edge side. The light source is mounted on the outer edge side of the scale ruler main body, having a plurality of light beads and being capable of displaying scale. The vernier base is removably mounted on the outer edge side of the scale ruler main body, being capable of moving along a length direction of the outer edge side of the scale ruler main body. The distance conversion assembly is configured to calculate a movement of the vernier base from an origin on the outer edge side of the scale ruler main body.

18 Claims, 10 Drawing Sheets

ELECTRONIC SCALE RULER AND VERNIER CALIPER, AND USE METHOD THEREOF

CROSS-REFERENCE TO RELATED APPLICATIONS

This application claims priority to Chinese Application No. 202211578854.9, filed Dec. 7, 2022, now issued with Chinese Patent No. 115790309. The entire contents of the above-referenced applications and of all priority documents referenced in the Application Data Sheet filed herewith are hereby incorporated by reference for all purposes.

FIELD OF TECHNOLOGY

The present invention relates to the technical field of electronic measuring rulers, in particular to an electronic scale ruler and vernier caliper, and a use method thereof.

BACKGROUND

Rulers have been developed for hundreds or even thousands of years and now have entered an era of electronics or intelligence. For electronic measuring rulers, most of the existing electronic measuring rulers on the market have a single function and can only be used as either ordinary rulers for measurement or scale converters. For a common electronic measuring ruler, such as an electronic vernier caliper, a specific value of movement can be highlighted on a display by moving a moving grid assembly thereof, but it is always limited to a single size type (such as centimeters or feet). It will be very complicated to flexibly switch its size layout mode among various size types, because its ruler type (a fixed grid plate) is fixed and there is no way to replace it. One ruler can only be marked with 2-3 size types at most, and such ruler cannot be subject to scale conversion, such that it is impossible to measure an actual size according to a given scale and to obtain an actual scale through measurement when the scale is lost, making it very inconvenient to use. The present invention provides an electronic scale ruler, a vernier caliper with the scale ruler, and a use method thereof, to solve the above-mentioned technical problems.

SUMMARY

To overcome the deficiencies in the prior art, an objective of the present invention is to provide an electronic scale ruler and vernier caliper, and a use method thereof, so as to solve the technical problems mentioned in the background.

According to some embodiments, an electronic scale ruler is described. The electronic scale ruler has a scale ruler main body having an outer edge side, a main control board mounted on an inner side of the scale ruler main body, an input coupled to the main control board, a display screen coupled to the main control board, a light source mounted on the outer edge side of the scale ruler main body, the light source having a plurality of light beads and being capable of displaying scale, a vernier base removably mounted on the outer edge side of the scale ruler main body, the vernier base being capable of moving along a length direction of the outer edge side of the scale ruler main body, and a distance conversion assembly coupled to scale ruler main body, the distance conversion assembly being configured to calculate a movement of the vernier base from an origin on the outer edge side of the scale ruler main body.

According to some embodiments, the light source is a printed circuit board assembly (PCBA), and the plurality of light beads are positioned in an arrayed manner along a direction of movement of the vernier base. Each of the light beads forms a single light bead scale line.

According to some embodiments, the light beads are selectively turned on in an arrayed manner according to a turn-on instruction.

According to some embodiments, the light source is covered with at least one layer of brightening film along a length direction of the light source.

According to some embodiments, the distance conversion assembly includes a guide rack, a moving grid assembly, and a gear assembly. The guide rack is positioned along the length direction of the outer edge side of the scale ruler main body, and the moving grid assembly has one end connected to an inner side of the gear assembly and the other end connected to the main control board.

According to some embodiments, the vernier base is mounted at an upper end of the gear assembly, and the gear assembly is moved with the vernier base along the guide rack.

According to some embodiments, the gear assembly includes a gear and a bearing, and the moving grid assembly includes a radial magnetizer, a magnetic encoder, and a moving grid line group. The radial magnetizer is to convert a rotation angle of the gear into a radial magnetic field and the magnetic encoder is to decode the radial magnetic field.

According to some embodiments, the electronic scale ruler further includes a bottom board. The bottom board includes a plurality of scale line light troughs and a plurality of fixed-point scale grooves. Each of the plurality of fixed-point scale groove corresponds to each of the plurality of scale line light troughs, and each of the plurality of scale line light troughs corresponds to each of the light bead scale lines.

According to some embodiments, the scale ruler main body further includes a key area and a battery.

According to some embodiments, a pointer module is coupled to the vernier base, and the pointer module has a pointer and a prismatic lens. The prismatic lens is configured to project a light at a front end of a light bead scale line formed by one of the plurality of light beads.

According to some embodiments, a pencil cap is coupled to the vernier base, and the pencil cap adapted to receive a drawing tool.

According to some embodiments, the electronic scale ruler further includes a fixed assembly coupled to a side of the scale ruler main body, and a moving assembly to the scale ruler main body. The moving assembly has an upper moving clamping jaw and a lower moving clamping jaw capable of connecting to each other and the upper moving clamping jaw is coupled to the vernier base.

According to some embodiments, the moving assembly is coupled to a sliding adjustment assembly in such a way that the moving assembly is capable of moving along the length direction of the outer edge side of the scale ruler main body.

According to some embodiments, the moving assembly is coupled to a positioning assembly, and the positioning assembly configured to fix the moving assembly at a position relative to the fixed assembly.

According to some embodiments, the sliding adjustment assembly includes a thumb wheel and the thumb wheel is configured to rotate and move along the length direction of the outer edge side of the scale ruler main body.

According to some embodiments, a method of determining a measured distance using an electronic scale ruler is described. The method includes selecting a target unit size type from the input area, selecting a scale from the input area; sliding the vernier base from an origin to an end along the length direction of the electronic scale ruler, recording a measured distance from the origin to the end, calculating an actual distance, by the main control board, in accordance with the selected scale, and displaying the actual distance on the display screen.

According to some embodiments, method of determining an actual distance using an electronic scale ruler further including selecting a total length and a division number, calculating a unit length by dividing the total length by the division number, and determining a number of the plurality of light beads to be lit in accordance with the unit length.

According to some embodiments, a method of determining an actual scale using an electronic scale ruler is described. The method includes selecting a target unit size type from the input area, sliding the vernier base from an origin to an end along the length direction of the electronic scale ruler, recording a measured distance from the origin to the end, obtaining an actual distance from the origin to the end, determining an actual scale, by the main control board, by dividing the measure distance by the actual distance, and displaying the actual scale on the display screen.

Compared with the prior art, the present invention has the following beneficial effects:

(1) According to the present invention, a basic module and a scale conversion module of the electronic scale ruler are designed; and compared with a conventional simple scale ruler, the present invention has the advantages that single highlighting of the display screen is eliminated in terms of highlighting, and the light source is added in a conventional ruler mode and adopts clustered highlighting, such that highlighting of various size types can be switched without being limited to a single size type, and it is very friendly for engineers who require various unit sizes to make drawing.

(2) The distance conversion assembly is used in the electronic scale ruler designed by the present invention. A combination of the rack, the gear, the radial magnetizer, and the magnetic encoder is innovatively adopted, which avoids complex structural design and simplifies the structure. The rotation angle of the gear and the passed perimeter can be converted into the distance of movement, making the calculation more accurate.

(3) According to the electronic scale ruler designed by the present invention, the plurality of (300/3,000) light beads on the light source are selectively turned on to serve as the scale lines, and switching is performed using the function keys to directly measure the size, perform scale conversion to obtain the actual size, perform electronic equal division, or obtain the actual drawing scale of the non-scale drawing, such that powerful functions are implemented.

(4) The brightening film (a light guide film) is innovatively added to the light source. Scattered led light passes through the light guide film to become linear and softer light in the longitudinal direction, such that even smaller scale lines can be clearly displayed, which facilitates more accurate recognition of specific scale lines in subsequent areas.

(5) Compared with a measuring method for a conventional scale ruler or electronic ruler, measuring methods of measurement by a ruler, electronic equal division, measurement in a scale ruler mode, etc. are included in the use method of this scale ruler, making it applicable to most measuring scenarios; and both the measuring initial point and the measuring direction of this scale ruler are not limited, making it suitable for the vast majority of users and very practical.

Figure 1:
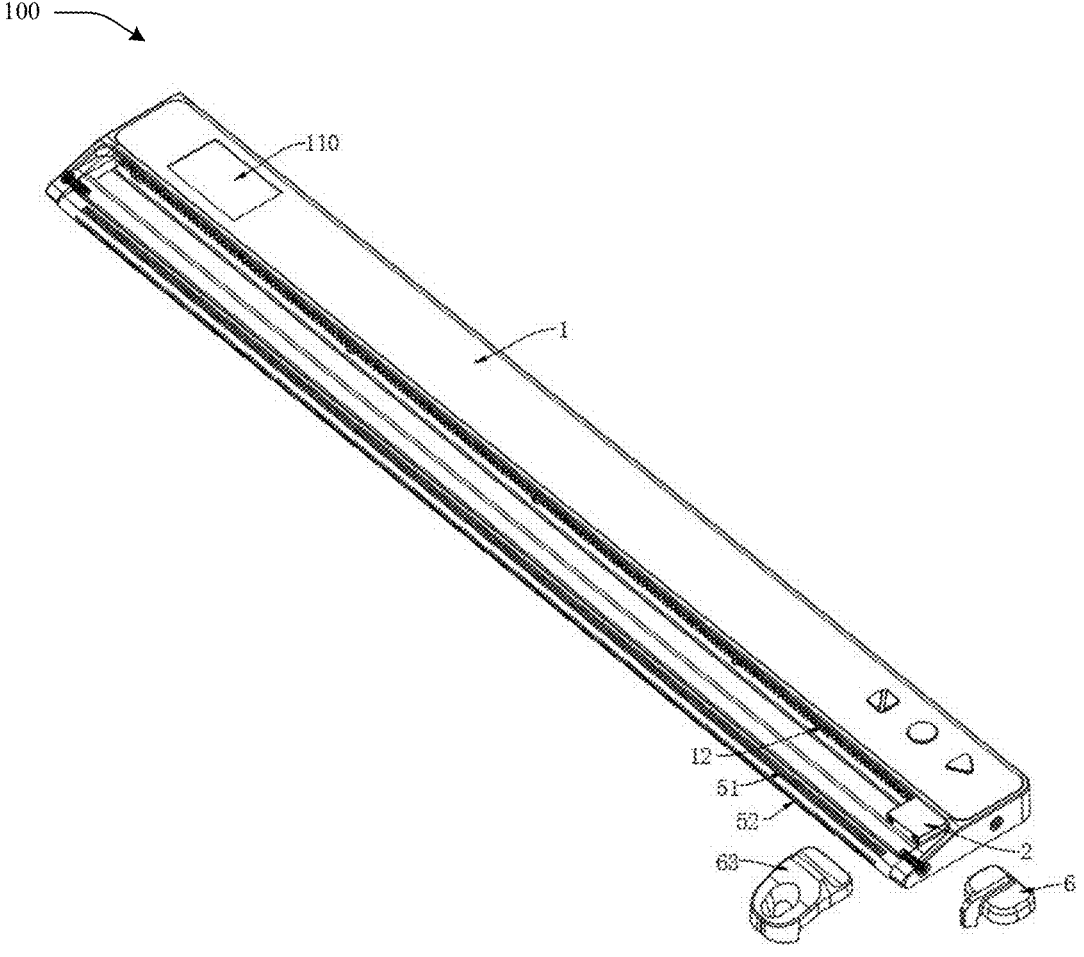
FIG. 1 is a schematic diagram of an electronic scale ruler, according to some embodiments.

In the drawings: scale ruler main body 1, end screw hole 101, long positioning groove 102, key area 103, battery 104, left side cover 105, right side cover 106, bottom cover 107, surface cover 108, main control board 109, and display screen 110;

vernier base 2, cover seat 21, modular cover platform 22, outer side clamping groove 221, clamping bulge 222, line group connecting piece 23, and bottom ring cavity 24;

light source 10, brightening film 11, and guide rack 12;

moving grid assembly 3, radial magnetizer 31, magnetic encoder 32, and moving grid line group 33;

gear assembly 4, gear 41, gear shaft 42, gear shaft hole 421, and bearing 43;

bottom board 5, scale line light trough 51, and fixed-point scale groove 52;

pointer module 6, sleeving groove 61, inner side clamping groove 611, clamping recess 612, pointer 62, prismatic lens 621, and projection arc surface 622;

pencil cap 63, pencil insertion hole 631, pencil tip hole 632, and boosting portion 633;

fixed clamping claw 7, first hand screw 71, and head cover screw hole 72;

upper moving clamping jaw 8, thumb wheel 81, thumb wheel rotary table 811, thumb wheel assembly groove 82, outer side expansion portion 821, inner side contraction portion 822, thumb wheel assembly platform 83, sleeving piece 84, auxiliary rotary wheel 85, rotary wheel groove hole 86, and articulated structure 87; and lower moving clamping jaw 9, ring sleeve groove 91, articulated structure 92, inlay groove 93, inlay piece 94, and second hand screw 95.

DESCRIPTION OF THE EMBODIMENTS

The present invention will be further described with reference to the accompanying drawings and specific embodiments below. It should be noted that the various embodiments or technical features described below may be arbitrarily combined to form new embodiments, without conflict.

Reference is made to FIGS. 1-15.

Figure 2:
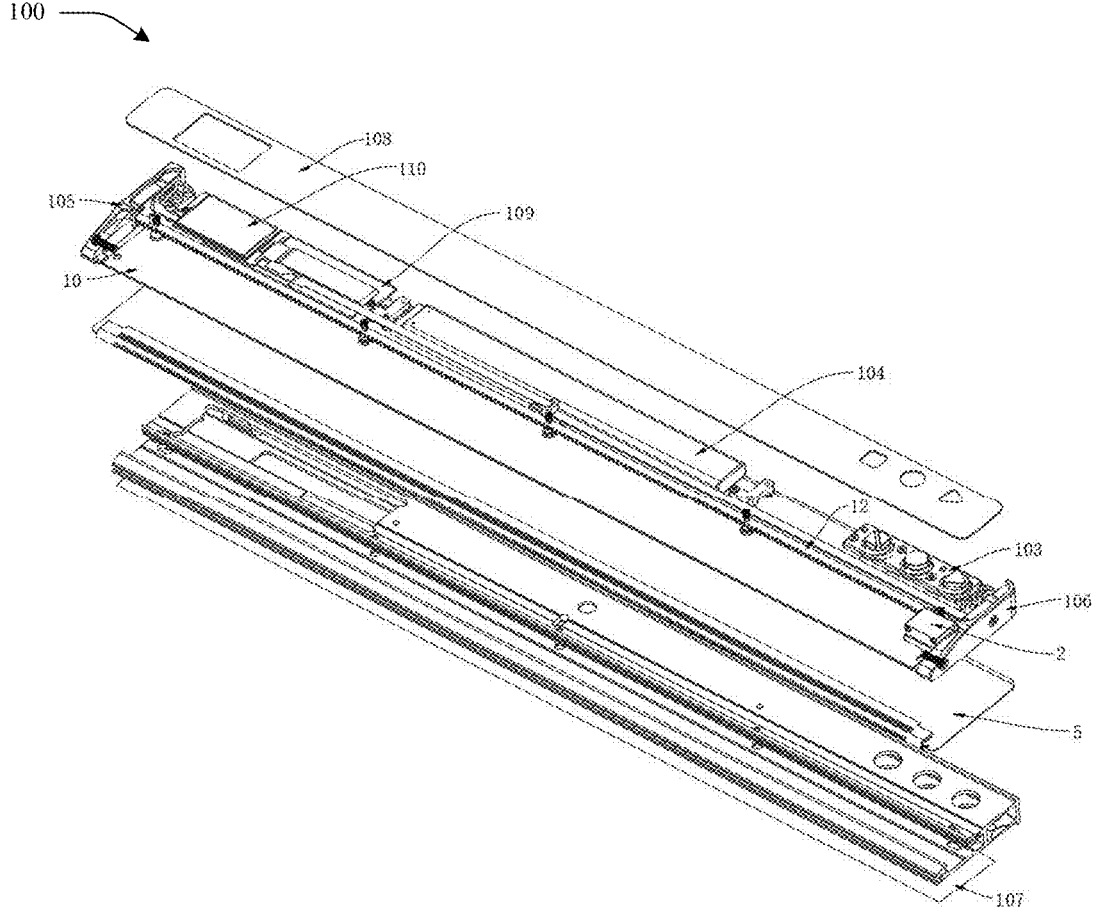
FIG. 2 is a schematic exploded view of an overall structure of the electronic scale ruler, according to some embodiments.
Figure 3:
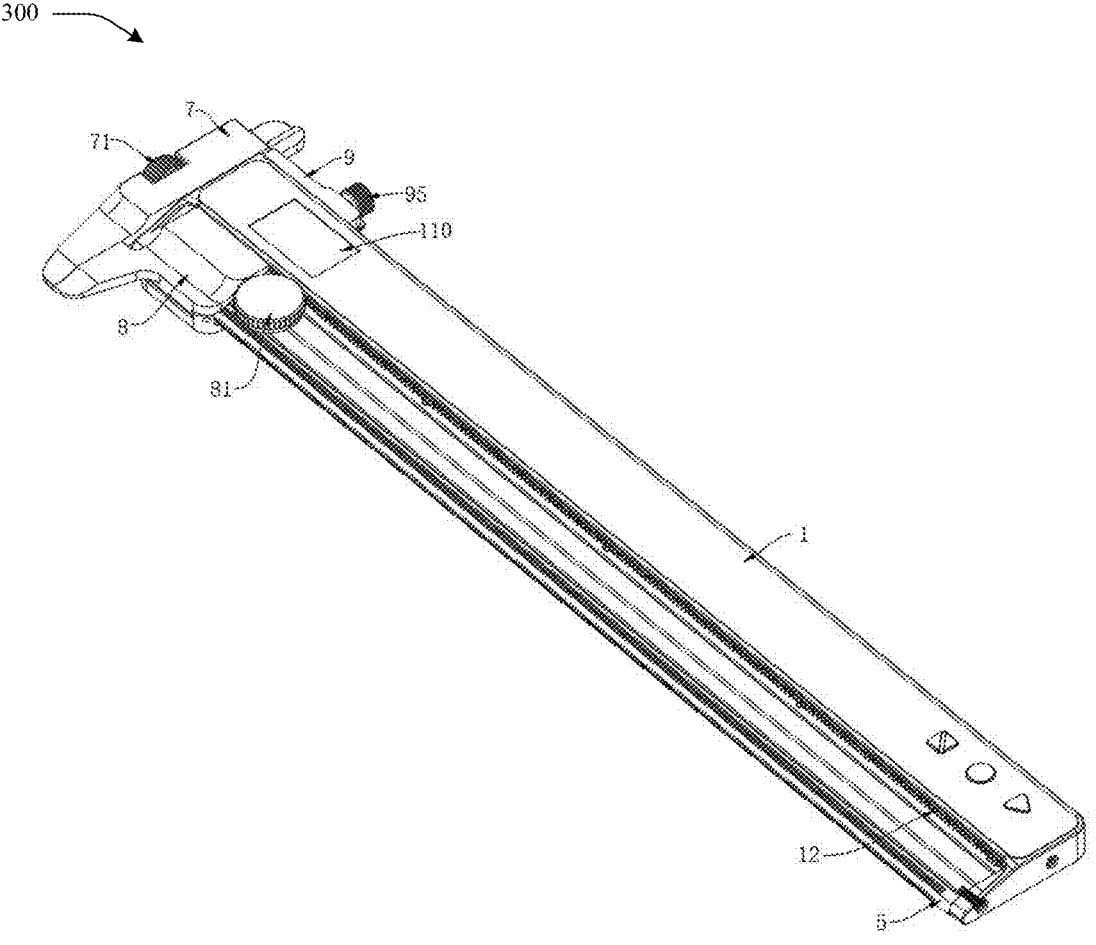
FIG. 3 is a schematic diagram of an electronic vernier caliper, according to some embodiments.

First, referring to FIG. 1 and FIG. 2, the present invention discloses an electronic scale ruler 100. The electronic scale ruler 100 may include a scale ruler main body 1, a vernier base 2, a light source 10, a key area 103, a main control board 109, and a display screen 110. The main control board 109 is mounted on an inner side of the scale ruler main body 1. The electronic scale ruler 100 is able to calculate a size of movement of a vernier base 2 by inputting various conversion scales, and capable of performing display by a display screen 110 connected thereto, where certainly, the main control board 109 may alternatively display an actual size directly when the electronic scale ruler is used as an ordinary measuring ruler. The light source 10 is capable of being turned on in an arrayed manner, and mounted on an outer ruler edge side of the scale ruler main body 1, being electrically connected to the main control board 109, and presenting a final displayed scale by receiving a display instruction from the main control board 109. The vernier base 2 is mounted on an inner side of the light source 10 and capable of moving along a length direction of the light source 10. The distance conversion assembly 200 (shown in FIG. 4) is arranged on one side of the vernier base 2 and cooperating with the vernier base 2 to calculate an actual size of movement of the vernier base 2 from an origin, so as to serve as a basic value of conversion for subsequent switching of other functions, where for example, if a value of movement of the vernier base 2 is 1 cm, and a conversion scale used currently is 1:100, an actual size of a drawing is 100 cm. As mentioned above, the light beads capable of being turned on in an arrayed manner are arranged on the light source 10, and each light bead can correspond to one number, such that light bead numbers corresponding to different size types can be subject to cluster classification based on preset size types. For example, if a distance from each light bead is 1 mm, a first light bead, a tenth light bead, a twentieth light bead, and the like are turned on in cm, respectively representing values of 0, 1 cm, 2 cm, and so on; and if a distance from each light bead is 0.1 mm, a more accurate size type such as feet can be replaced and highlighted.

In an embodiment, the light source 10 is a printed circuit board assembly (PCBA, namely, one circuit board integrated with a plurality of light beads) and is provided with a plurality of light beads in an arrayed manner along a direction of movement of the vernier base 2, and herein, there may be preferably 300 light beads where a distance from each light bead is 1 mm, or 3,000 light beads where a distance from each light bead is 0.1 mm, where each light bead extends to form a single light bead scale line, and the light beads are selectively turned on in an arrayed manner according to a turn-on instruction sent by the main control board 109 (for a specific method, reference is made to a use method below).

Figure 4:
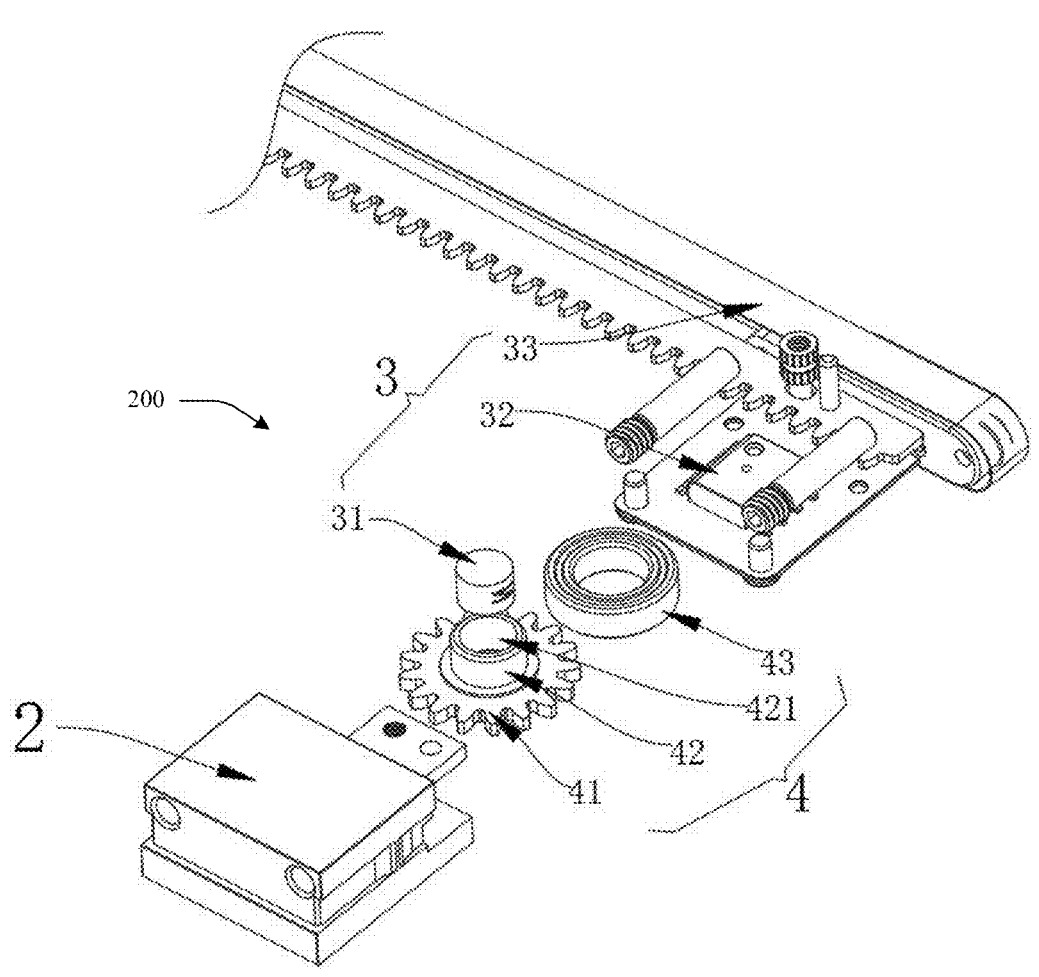
FIG. 4 is a schematic diagram of a distance conversion assembly having a moving grid assembly and a gear assembly, according to some embodiments.

FIG. 4 is a schematic diagram of the distance conversion assembly 200, according to some embodiments. The distance conversion assembly 200 includes a guide rack 12, a moving grid assembly 3, and a gear assembly 4. The guide rack 12 is laid along the length direction of the light source 10. The moving grid assembly 3 has one end mounted on an inner side of the gear assembly 4 and the other end connected to the main control board 109, where the gear assembly 4 is configured to move along the guide rack 12. The moving grid assembly 3 is responsible for transmitting distance information of rotation or movement of the gear assembly 4 to the main control board 109. The vernier base 2 is mounted at an upper end of the gear assembly 4, and the gear assembly 4 is capable of being driven by pulling the vernier base 2 to move along the guide rack 12, and eventually a size of movement of the vernier base 2 relative to an origin position is capable of being calculated.

Figure 10:
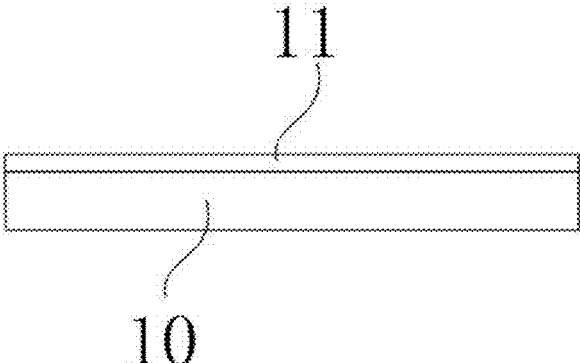
FIG. 10 is a cross-sectional view of a light source and a brightening film, according to some embodiments
Figure 11:
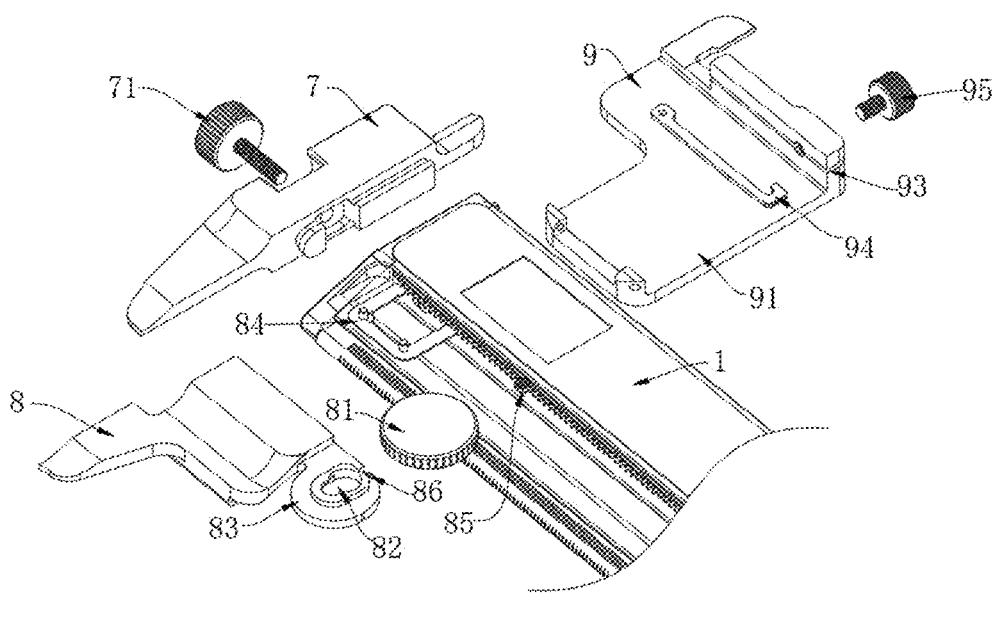
FIG. 11 is a partial exploded view of the electronic vernier caliper, according to some embodiments.
Figure 12:
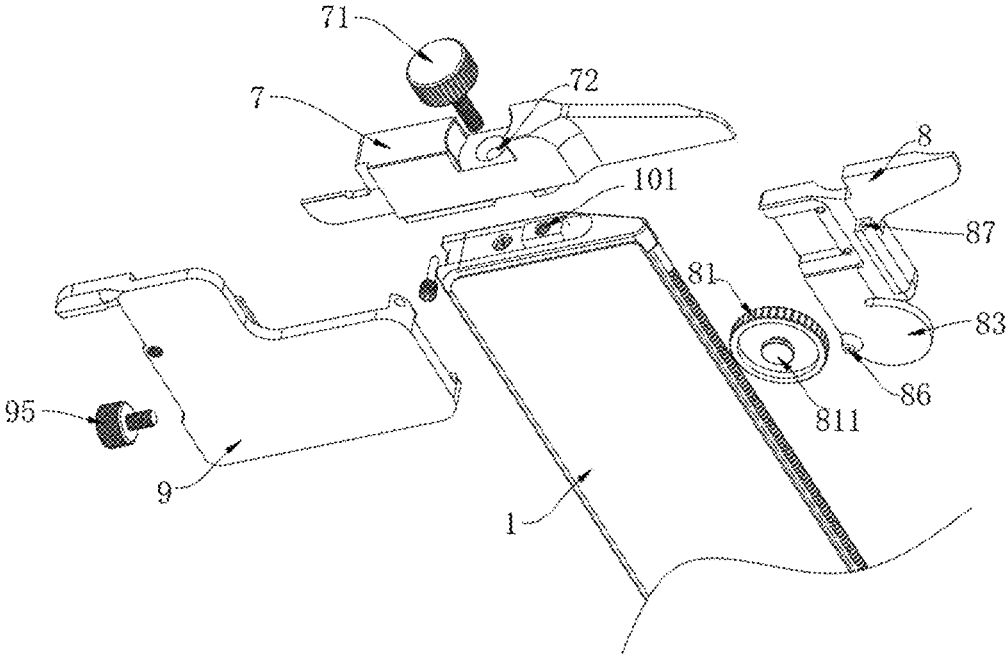
FIG. 12 is a second partial exploded view of the electronic vernier caliper, according to some embodiments.
Figure 13:
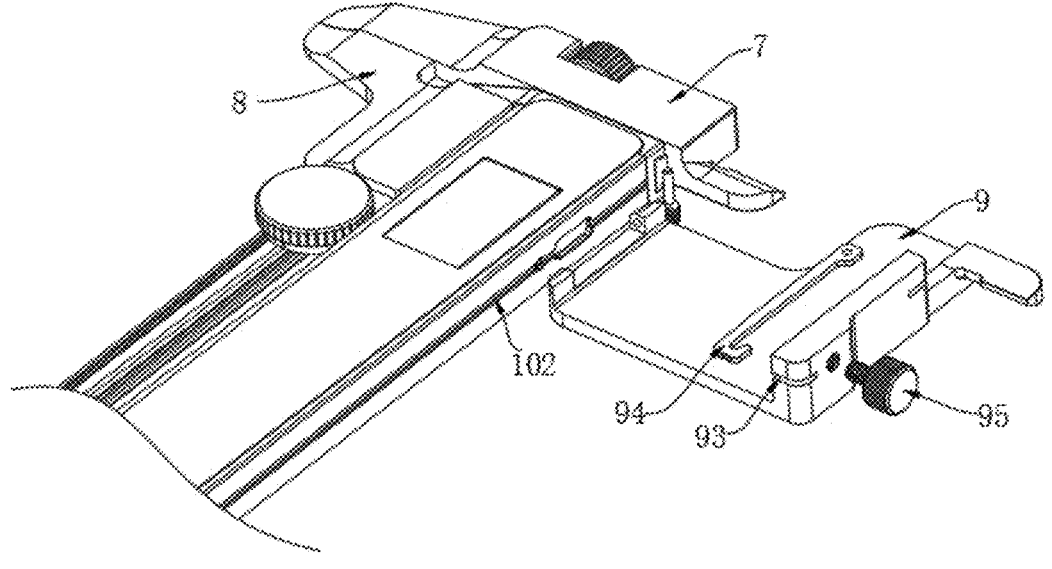
FIG. 13 is a third partial exploded view of the electronic vernier caliper, according to some embodiments.
Figure 14:
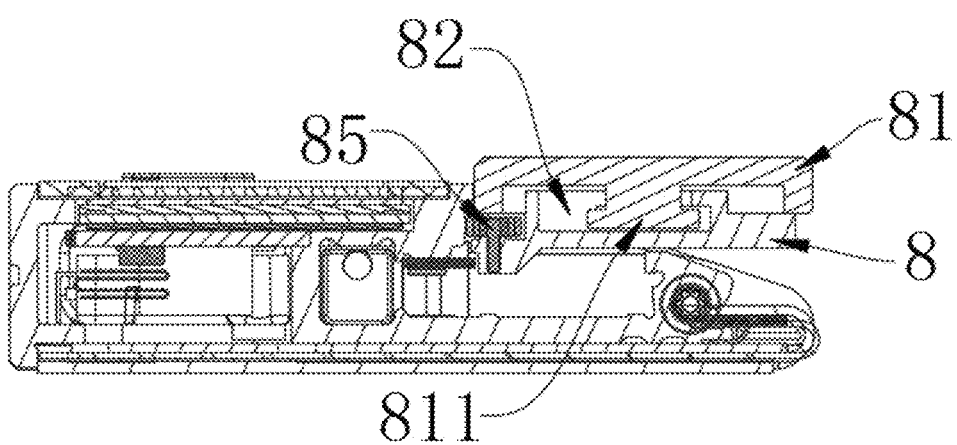
FIG. 14 is a cross-sectional view of the electronic vernier caliper, according to some embodiments.
Figure 15:
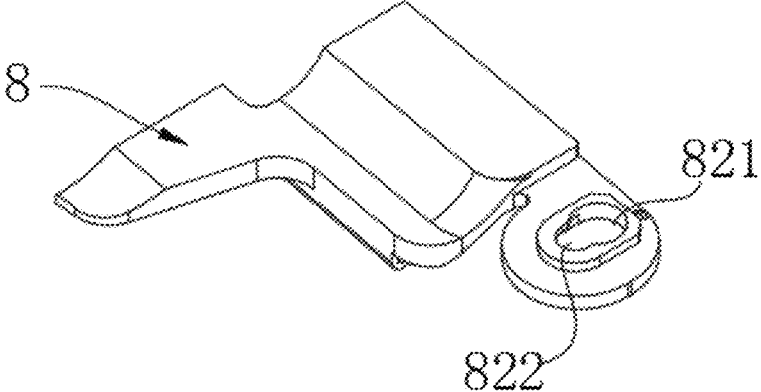
FIG. 15 is a schematic diagram of a thumb wheel assembly groove of an upper moving clamping jaw in the electronic vernier caliper, according to some embodiments.

Referring to FIG. 10, which is a cross-sectional view of a light source and a brightening film, in a further supplementary embodiment, when there are few scale lines, light emitted by all the light beads will not affect one another, but most of the light beads are LED light beads and emitted light has scattering properties. In other words, if two adjacent light beads are too close and are both turned on, a combination of the two light beads is presented in the naked eyes, such that two scale lines cannot be accurately distinguished. In view of this, an outer side of the light source 10 is covered with a brightening film 11, also known as a light guide film, and there may be one or a plurality of layers of brightening films. The brightening film 11 is capable of guiding scattered light upwards to form longitudinal light, thus avoiding the above-mentioned technical problem. The light emitted by each light bead can form a single scale line, which is easier to distinguish with the naked eyes, and the light looks softer. The brightening film 11 is laid along the length direction of the light source 10 and configured to make the light emitted by the light beads of the light source 10 linear and softer in a longitudinal direction.

Figure 9:
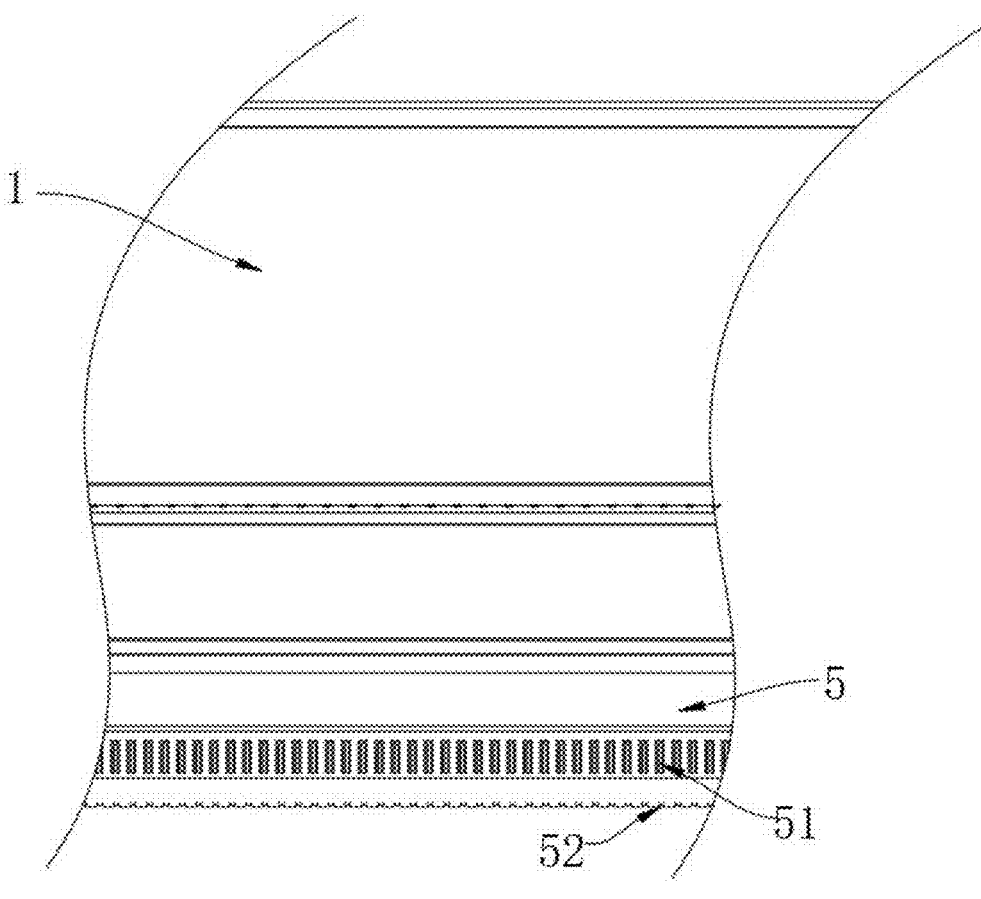
FIG. 9 is a partial top view of a bottom board, a scale line light trough, and a fixed-point scale groove, according to some embodiments.

FIG. 9 is a partial top view of a bottom board 5, a scale line light trough 51, and a fixed-point scale groove 52, according to some embodiments. Referring to FIG. 2 and FIG. 9, in an aspect of providing protection for the light source 10, the electronic scale ruler is further provided with a bottom board 5. The bottom board 5 is matched with the light source 10 and provided with a wrapping portion at one end. The wrapping portion wraps the light source 10 to prevent damage of the light source 10, and correspondingly, the wrapping portion of the bottom board 5 may be made transparent or may be a metal plate. If the wrapping portion is made into the metal plate, a position where the light scale lines can be seen needs to be designed. In the present invention, a plurality of scale line light troughs 51 are arranged in an arrayed manner at positions, corresponding to light bead scale lines, of the bottom board 5, and each scale line light trough 51 corresponds to one light bead scale line; a fixed-point scale groove 52 is further arranged at a position, corresponding to each scale line light trough 51, of an outer side of the bottom board 5. The scale line light troughs 51 and the fixed-point scale grooves 52 may be formed by etching the metal plate by means of etching. The scale line light troughs 51 are located on an upper surface of the bottom board 5 and distributed in an arrayed manner along the length direction of the light source 10, while the fixed-point scale grooves 52 are located on an outer side surface of the bottom board 5 and also distributed in an arrayed manner along the length direction of the light source 10, where an outer side of one scale line light trough 51 corresponds to one fixed-point scale groove 52. Relatively, the scale line light troughs 51 and fixed-point scales are perpendicular to each other, such that if the scale line light troughs 51 are in a horizontal direction, the fixed-point scale grooves 52 is in a vertical direction, and the fixed-point scale grooves 52 are beneficial for a user to accurately find the corresponding light-emitting scale lines during line drawing with a pencil.

Referring to FIG. 2, a key area 103 is further arranged on one side of the scale ruler main body 1. The key area 103 includes a plurality of buttons, such as a toggle button, a switch button, a number button, a confirmation button, and a reset button. A battery 104 is arranged on one side of the key area 103. The scale ruler main body 1 further includes a left side cover 105, a right side cover 106, a bottom cover 107, and a surface cover 108.

Figure 5:
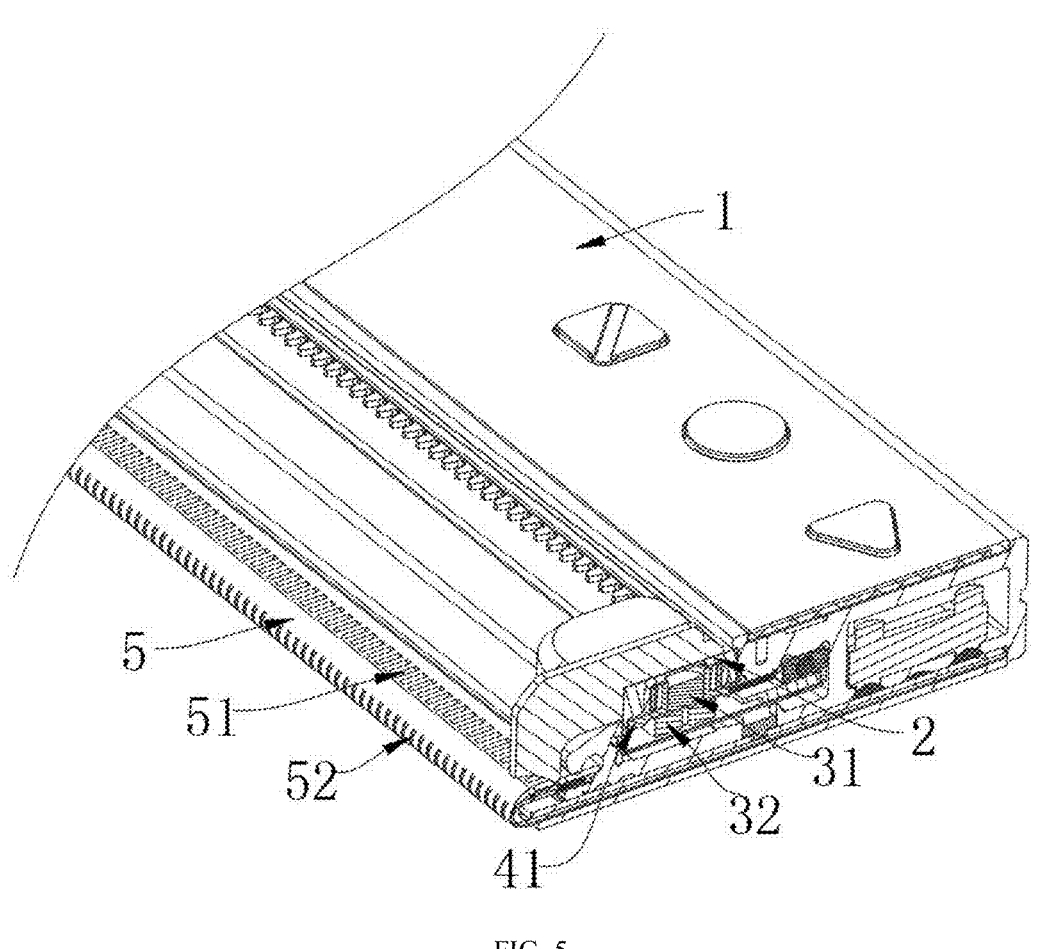
FIG. 5 is a cross-sectional view of the electronic scale ruler of FIG. 1, showing the moving grid assembly and the gear assembly, according to some embodiments.

FIG. 5 is a cross-sectional view of the electronic scale ruler of FIG. 1, showing the moving grid assembly 3 and the gear assembly 4, according to some embodiments. Referring to FIGS. 4-5, in another embodiment, the gear assembly 4 includes a gear 41 and a bearing 43. The gear 41 is connected to a gear shaft 42 in an upwards raised manner, and the gear shaft 42 is internally hollowed out to form a gear shaft hole 421. The moving grid assembly 3 includes a radial magnetizer 31, a magnetic encoder 32, and a moving grid line group 33. The bearing 43 is sleeved on an outer side of the gear shaft 42. That is, the gear shaft 42 upwards extending out of a middle section of the gear 41 is equivalent to a rotary shaft of the gear 41

Figure 6:
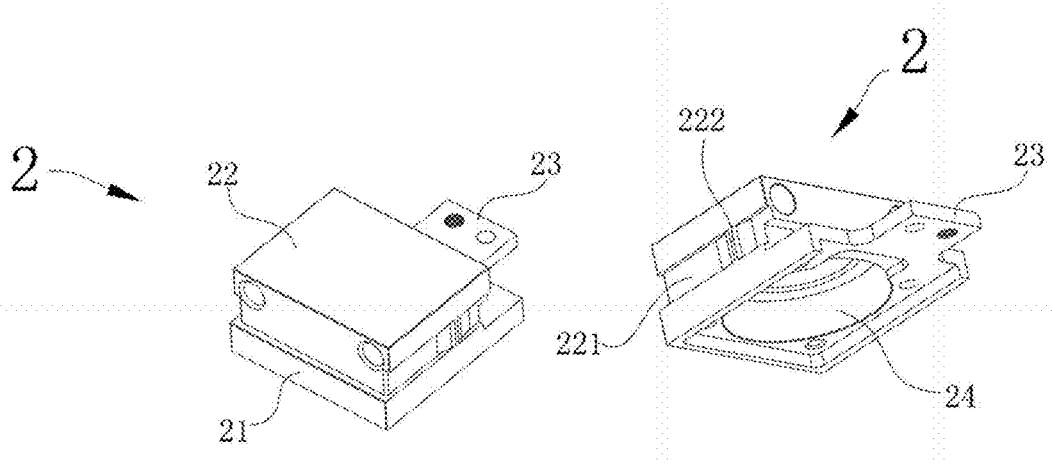
FIG. 6 is a schematic diagram of a vernier base shown from a top perspective view and bottom perspective view, according to some embodiments.

FIG. 6 is a schematic diagram of vernier base 2 shown from a top perspective view and bottom perspective view, according to some embodiments. The vernier base 2 includes a cover seat 21, a modular cover platform 22, a line group connecting piece 23, and a bottom ring cavity 24. The modular cover platform 22 is configured to be sleeved with an external kit is arranged at an upper end of the cover seat 21. Outer side clamping grooves 221 are arranged on two sides of the modular cover platform 22, and clamping bulges 222 are arranged on inner sides of the outer side clamping grooves 221. When the modular cover platform 22 is not sleeved with the external kit, the modular cover platform 22 is capable of being pulled to be used as a basic scale ruler; when the modular cover platform 22 needs to be sleeved with the external kit (such as a vernier caliper, a pencil cap 63, or a pointer module 6), the clamped connection is capable of being performed by the outer side clamping grooves 221 on the two sides, the clamping bulges 222, and the modular cover platform 22. The cover seat 21 extends inwards to form the line group connecting piece 23. The moving grid line group 33 is connected to the line group connecting piece 23, and the moving grid line group 33 is a soft line group, which facilitates the movement in an internal space of the scale ruler main body 1 along with the vernier base 2. A bottom of the cover seat 21 is recessed upwards to form the bottom ring cavity 24. The bearing 43 in the gear assembly 4 are nested in the bottom ring cavity 24. The radial magnetizer 31 is arranged in the gear shaft hole 421 of the gear 41. The magnetic encoder 32 is connected to a lower end of the radial magnetizer 31. Specifically, because the radial magnetizer 31 is arranged in the gear shaft hole 421 of the gear 41, the magnetic encoder 32 is exactly located at a lower end of the gear 41. The radial magnetizer 31 is responsible for converting a rotation angle of the gear 41 into a radial magnetic field and transmitting the radial magnetic field to the magnetic encoder 32, and the magnetic encoder 32 performs decoding and then transmits data to the main control board 109 from the moving grid line group 33.

In other embodiments, because moving grid measurement is a very common technology, a combination of a moving grid plate or a fixed grid plate may also be used herein; if the moving grid plate is mounted below the gear 41, the above-mentioned function may also be implemented with an upper end plane of the guide rack 12 or the scale ruler main body 1 as the fixed grid plate; but relatively, the magnetic encoder 32 can hide most of the assemblies more accurately.

Figure 7:
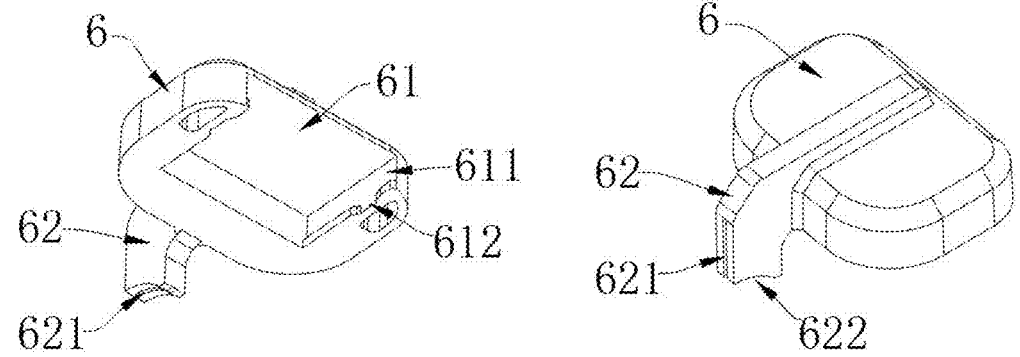
FIG. 7 is a schematic diagram of a pointer module shown from a bottom perspective view and a top perspective view, according to some embodiments.

FIG. 7 is a schematic diagram of a pointer module 6 shown from a bottom perspective view and a top perspective view, according to some embodiments. Referring to FIG. 1 and FIG. 7, in the description of the foregoing external kit, in an embodiment, the external kit is a pointer module 6. A sleeving groove 61 in clamped connection with the modular cover platform 22 is arranged at a lower end of the pointer module 6. Inner side clamping grooves 611, cooperating with the outer side clamping grooves 221, are formed on side edges of the sleeving groove 61. A clamping recess 612 clamped to the corresponding clamping bulge 222 is arranged on one side of each inner side clamping groove 611. A pointer 62 is arranged on one side of the pointer module 6. A prismatic lens 621 is arranged on an inner side of the pointer 62. A projection arc surface 622 recessed upwards is further arranged at a bottom of the pointer 62. The prismatic lens 621 can project light to a front end of the light bead scale line through the projection arc surface 622. A light guide source of the prismatic lens 621 may be provided with a light bead on an inner side of the prismatic lens 621, and a magnetic switch is arranged at the sleeving groove 61. The magnetic switch is in contact with a conductive part at the bottom to turn on a current to emit light. With the aid of such development technology feature, more precise scale guidance is provided for the user during use, and without checking the highlighted scale on the bottom board 5, it is possible to determine a position where the vernier base 2 is moving, so as to determine whether a line is drawn in place. For example, when the user needs to draw a line of 10 cm, a common method is to directly find a scale line of 10 cm, and drawing starts from the source and stops after the scale line of 10 cm is reached, where whether the scale line is truly reached is determined through observation of the eyes of the user. Due to an angle difference between glasses of the user and the scale line or paper, there may be a deviation between an actual scale and a scale that the user thinks. However, with the prismatic lens 621 for guide of light development, the vernier base 2 can be moved to the position of 10 cm first, and the display screen 110 can highlight whether the vernier base is truly moved to the position of 10 cm. When the vernier base 2 is moved to the position, light on a prism is directly projected onto the paper in front of the scale line of 10 cm, and a line is directly drawn on the paper in a point-to-point manner, which is longer and more accurate than a line drawn under the angle difference through the observation of the human eyes.

Figure 8:
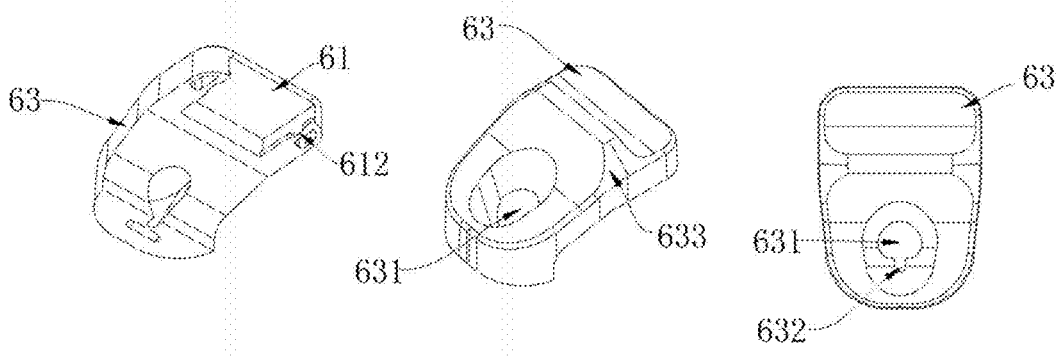
FIG. 8 is a schematic diagram of a pencil cap module shown from a bottom perspective view, a top perspective view, and a top plan view, according to some embodiments.

FIG. 8 is a schematic diagram of a pencil cap module 63 shown from a bottom perspective view, a top perspective view, and a top plan view, according to some embodiments. Referring to FIG. 1 and FIG. 8, in the description of the foregoing external kit, in another embodiment, the external kit is a pencil cap 63. A sleeving groove 61 in clamped connection with the modular cover platform 22 is arranged at a lower end of the pencil cap 63. Inner side clamping grooves 611 cooperating with the outer side clamping grooves 221 are formed on inner side edges of the sleeving groove 61. A clamping recess 612 clamped to a corresponding clamping bulge 222 is arranged on one side of each inner side clamping groove 611. A pencil insertion hole 631 is arranged on an inner side of the pencil cap 63. A pencil tip hole 632 is arranged on one side of the pencil insertion hole 631. A boosting portion 633 is arranged at an upper end of the pencil cap 63, AND the boosting portion 633 being capable of being used for a finger to perform auxiliary boosting during line drawing by a pencil. The pencil can be inserted into the pencil insertion hole 631 by means of specific numerical imaging of the display screen 110 to perform fixed-length line drawing.

Referring to FIG. 3 and FIGS. 11-15, the present invention further discloses an electronic vernier caliper 300. The electronic vernier caliper 200 includes the main components of the electronic scale ruler 100, where the vernier caliper includes a fixed assembly and a moving assembly, the fixed assembly including a fixed clamping jaw 7 and a first hand screw 71. An end screw hole 101 used in cooperation with the first hand screw 71 is arranged at an end of a scale ruler main body 1. A head cover screw hole 72 used in cooperation with the end screw hole 101 is arranged on the fixed clamping jaw 7. The first hand screw 71 penetrates through the end screw hole 101 and the head cover screw hole 72 to fixedly connect the fixed clamping jaw 7 to the scale ruler main body 1. The moving assembly includes an upper moving clamping jaw 8 and a lower moving clamping jaw 9, the lower moving clamping jaw 9 being formed with a ring sleeve groove 91 configured to sleeve the scale ruler main body 1. An articulated structure 87 articulated with the upper moving clamping jaw 8 is formed on an outer side of the ring sleeve groove 91. An outer side of the upper moving clamping jaw 8 is articulated with an outer side of the lower moving clamping jaw 9 by the articulated structure 87. A sleeving groove 61 in clamped connection with a modular cover platform 22 is formed on an inner side of the upper moving clamping jaw 8. A sleeving piece 84 is connected to a lower end of the sleeving groove 61. Inner side clamping grooves 611, cooperating with outer side clamping grooves 221, are formed at ends of the sleeving piece 84 and the sleeving groove 61. Clamping recesses 612 clamped to clamping bulges 222 are arranged on one side of the sleeving piece 84. A sliding adjustment assembly is arranged on the upper moving clamping jaw 8, the sliding adjustment assembly being capable of driving the moving assembly to slide left and right relative to the scale ruler main body 1, and a positioning assembly is arranged on the outer side of the lower moving clamping jaw 9. The positioning assembly is capable of carrying out positioning after the sliding adjustment assembly adjusts the moving assembly to be at a certain position.

As mentioned above, differing from a conventional electronic vernier caliper, the upper moving clamping jaw 8 of the vernier caliper is provided with the sleeving groove 61 sleeved onto the vernier base 2 to implement accurate numerical movement; moreover, the scale ruler may also switch to various size types, and scale lines of different size types may be separately highlighted in a clustered manner, which is different from the simplicity of the conventional vernier caliper.

In an embodiment, the sliding adjustment assembly includes a thumb wheel 81 and a thumb wheel assembly groove 82; a thumb wheel assembly platform 83 extends out of one side of the upper moving clamping jaw 8; the thumb wheel assembly groove 82 is arranged on the thumb wheel assembly platform 83; a thumb wheel rotary table 811 is arranged on an inner side of the thumb wheel 81, the thumb wheel rotary table 811 being embedded into the thumb wheel assembly groove 82 to implement rotation; an end surface of an outer side wheel body of the thumb wheel 81 exactly abuts against the scale ruler main body 1, and the thumb wheel is capable of rotating and moving along a length direction of the scale ruler main body 1; the positioning assembly includes a second hand screw 95, the second hand screw 95 penetrating through a side plate of the lower moving clamping jaw 9 and abutting against the scale ruler main body 1; and after the moving assembly of the vernier caliper is slid to a certain position by the sliding adjustment assembly, the moving assembly is capable of being fixed by tightening the second hand screw 95 inwards, or the moving assembly is capable of continuing moving by loosening the second hand screw 95.

In an embodiment, an auxiliary rotary wheel 85 is further arranged at a lower end of the thumb wheel 81; a rotary wheel groove hole 86 for the auxiliary rotary wheel 85 to rotate is arranged on an outer side of the thumb wheel assembly groove 82; a rotary shaft end extending out of a lower end of the auxiliary rotary wheel 85 is inserted into the rotary wheel groove hole 86; a wheel body of the auxiliary rotary wheel 85 abuts against lower ends of the scale ruler main body 1 and the thumb wheel 81 to assist in and limit sliding of the upper moving clamping jaw 8 along the scale ruler main body 1; an inlay groove 93 is arranged on an inner side of the side plate of the lower moving clamping jaw 9; an inlay piece 94 is embedded in the inlay groove 93; one end of the inlay piece 94 is fixed to one end of the side plate of the lower moving clamping jaw 9 in an articulated manner; the second hand screw 95 abuts against the inlay piece 94; a long positioning groove 102 is arranged at a position, corresponding to the inlay piece 94, of the scale ruler main body 1; the inlay piece 94 is capable of being driven by tightening the second hand screw 95 inwards to be embedded into the long positioning groove 102 and clamped to the long positioning groove 102; the thumb wheel assembly groove 82 includes an outer side expansion portion 821 and an inner side contraction portion 822, the outer side expansion portion 821 communicating with the inner side contraction portion 822 and having a diameter greater than a diameter of the inner side contraction portion 822; and the thumb wheel rotary table 811 enters the inner side contraction portion 822 from the outer side expansion portion 821 to perform rotation limiting.

The present invention further discloses a method of determining an actual distance and a method of determining an actual scale using an electronic scale ruler, including the following several steps or usage modes.

In S1, all light beads corresponding to light bead scale lines arrayed on a light source 10 are numbered in advance; then a scale cluster of scale positions of various unit sizes, such as centimeters and feet, is preset, and corresponding numbers for different unit sizes that need to be lighted are collected and stored in a main control board 109, such that switching to a display cluster of various unit sizes is capable of being performed through key control of a key area 103 subsequently; and finally, a specific size is displayed through sliding of a vernier base 2 and a display screen 110, so as to directly measure a size, perform scale conversion to obtain an actual size, perform electronic equal division, or obtain an actual drawing scale of a non-scale drawing.

A size type of cm and a size type of mm are used as examples below. As an embodiment, there are 300 light beads numbered D1-D300 on the light source 10, and a distance from each light bead is 1 mm. If the size type of mm needs to be highlighted, all the light beads numbered D1-D300 need to be turned on, and a system records such highlighting mode as 1. When switching to such size type is required, it is needed to press a toggle key and then press a number 1. If the size type of cm needs to be highlighted, D10, D20, D30 till D300 in D1-D300, that is, numbers of the lightbeads that are multiples of D10 need to be highlighted, such that the highlighted numbers of the light beads involved in this cluster are recorded, and a highlighting mode is recorded as 2. When switching to such size type is required for highlighting, it is needed to press the toggle key and then press a number 2. In a similar way, various other size types, such as decimeters, feet, and inches may be set. It should be noted that the present invention discloses a method in which a light bead scale line nearby numbered by rounding-off is highlighted for a specific number, not exactly a specific size type. For example, 1 inch is approximately equal to 25.4 mm, roughly between light beads numbered D25 and D26. In this case, because there are no light beads between the two light beads, nearby highlighting is performed in a rounding-off form. That is, D25 is selected and highlighted as a first inch, and the rest can be done in the same manner. Certainly, as a more accurate choice of the light source 10, there may be chosen to have 3,000 light beads (a distance from each light bead is 0.1 mm) numbered D1-D3,000 on the light source 10. The specific number of light beads may be set according to different requirements. The greater the number of light beads is, the more accurate the subsequently displayed size is.

In S2, the use method may be classified as the electronic equal division. For example, when a construction worker needs to evenly cut one ceramic tile into five pieces, a conventional method is to measure a total length thereof, then divide it by 5, and use a ruler to measure a size of each piece, which is time-consuming and laborious. A method used herein is as follows: after switching to a target unit size type is performed through key control, a total length L1 and the number F1 of cut pieces are input by keys. A specific light bead scale line corresponding to the total length is first measured at a single end of the light source 10, then equal division calculation is performed according to the number F1 of cut pieces, and a number corresponding to the specific light bead scale line is allocated to be highlighted, which facilitates equal division of a certain fixed-length item. For example, if a ceramic tile of 80 cm is divided into four pieces, it is very easy; that is, a middle of the ceramic tile is cut off, and then the middles of two pieces are cut off. However, if a ceramic tile is equally divided into five pieces, each having a width of 16 cm, a conventional method is quite time-consuming and laborious. In view of this, it is possible to input L1 of 80 cm and then input F1 of 5, which means division into five pieces, and then the ruler will highlight a scale line of 80 cm first and then highlight four scale lines of 16 cm, 32 cm, 48 cm, and 64 cm in the middle at once, such that a user can perform cutting along the four scale lines to obtain the most accurate size. Certainly, the ruler may not be 80 cm long. In this case, a scale ruler can be introduced; that is, conversion is performed in scale. If an input scale is 1:5, 1 cm on the ruler represents an actual size of 5 cm. The system will perform highlighting automatically according to a size of a real object or actual data on the ruler, which can be switched by a key. A specific scale highlighting method is shown in S3, where for a scale conversion form, if a numerical size is exactly between the scale numbers of two light beads, nearby highlighting is also performed in the rounding-off form. For example, when a scale is 1:72, a distance from each light point is represented by 1 m but by 13.88 mm on the ruler. That is, 13.88 mm=1 m, and the system chooses to highlight a light bead scale line of 14 mm to represent 1 m, and so on.

In S3, when S2 does not need to be performed, S3 may be performed; after switching to the target unit size type is performed through the key control, switching to a scale B1, such as 1:10 and 1:100, of a scale ruler, is performed by a key; after an actual measured size L2 is confirmed, the main control board 109 calculates an actual size of a measured distance according to a preset calculation formula of L=L2/B1; alternatively, after a specific scale of the scale ruler is input, a certain length is directly measured on the drawing, and the main control board 109 performs direct conversion to obtain an actual size to be displayed on the display screen 110, where a scale B may be preset by the system or set by the user according to a requirement. The scale may be preset by the toggle key and named to be called out during next use. The system may remember 100 scales at most. If a certain drawing is gotten and an actual length in the drawing is not marked, but it is known that a scale thereof is 1:80 and a unit is the size type of cm, the user may set a scale of 1:80 in the system and call out a size of cm first, then create an option button on the system according to the called size, input 1 and 80 in sequence, and name and save a scale mode. During use, switching to this scale mode is performed, such that when a specific drawing is measured using the vernier base 2 of the scale ruler, the display screen 110 can display an actual size thereof, which is very friendly for building drawings, and an engineer can measure a true and approximate size thereof by using the scale ruler according to the drawing, thereby providing further references for subsequent building construction or design.

In S4, when S2 and S3 do not need to be performed, S4 may be performed; after switching to the target unit size type is performed through the key control, the scale ruler is switched by a key; and when an actual scale of the drawing is unknown, the main control board 109 can calculate the actual scale B2 (B2=L3/L4) of the drawing according to a physical length L4 marked by a line segment on the drawing by measuring a drawing size L3 at a certain distance, which is very practical for drawings not marked with drawing scales or wrongly marked with drawing scales.

In S5, in the above-mentioned S3 and S4, after scale definition is completed, the vernier base 2 is moved, a product calculates a length of movement of the vernier base 2 at a current scale, and conversion is performed to obtain a more accurate actual movement length in a scale mode.

In S6, the above-mentioned S2, S3, and S4 may be switched by function keys in the key area 103, where S1 is preset.

In S7, when data is measured using any mode in the above-mentioned S1-S5, a return-to-zero position of the vernier base is not limited to an origin, return-to-zero calculation may be performed with any scale line as an initial point through the setting of the function keys in the key area, and a distance conversion assembly 200 calculates a distance of movement of the vernier base from zero along with the main control board. When the same straight line needs to be measured for multiple times in segments, for example, when there are four points abcd on the same straight line, three distances a-b, b-c, and c-d need to be measured separately. When a second distance needs to be measured after the measurement of a first distance, a conventional method is to move the vernier base back to the origin and move the scale ruler main body forward to align the origin with an initial point of the next distance, which is very troublesome and easily leads to an inaccurate result due to the imprecise movement process. In addition, a return-to-zero method is provided; that is, the system customizes a coordinate origin (a position of a zero point) and reserves a function key for return to zero. When the first distance is measured, the system reads a first distance data. When the function key for return to zero is pressed, the system automatically uses an end point of a previous segment as a return-to-zero position by default to recalculate the next distance. In this case, after the distance a-b, such as 10 cm, is measured, when the function key for return to zero is pressed, the system automatically uses a light point (i.e. a light bead scale line) where 10 cm is located as an initial point for return-to-zero calculation of a next segment. Even if the next distance reaches an actual distance of 21 cm, the display screen still shows 11 cm calculated from 10 cm as the origin (the zero point), rather than 21 cm, such that there is no need to perform tedious operation steps of returning the vernier base to zero and moving the scale ruler main body. As a supplement, polynomial complexity calculation may also be performed by setting function keys for automatic summing and averaging.

In other alternative embodiments, in S8, when the data is measured using any mode in the above-mentioned S1-S5, with the aid of the distance conversion assembly, a coordinate origin (a zero point or an initial calculation point) in all the above-mentioned modes is not limited to a right side or a left side, and a system may obtain a positive number regardless of measurement from left to right or measurement from right to left by setting a free mode, and may further set a standard measuring direction, that is, whether an origin where an original position of a coordinate is located is located on the left side or the right side. If the origin is located on the left side, a function key for setting is pressed. In this case, a number from left to right is positive, and a number from right to left is negative. On the contrary, if the coordinate is moved to the rightmost origin position at the beginning, the function key for setting is pressed, and the direction from right to left is a positive direction by default, and so on. Therefore, this mode is very practical for users with different habits of measuring an initial direction.

The above-mentioned embodiments are only preferred embodiments of the present invention and cannot be used to limit the scope of protection of the present invention. Any non-substantive changes and replacements made by those skilled in the art based on the present invention fall within the scope of protection of the present invention.

What is claimed is:

1. An electronic scale ruler, comprising:
a scale ruler main body having an outer edge side;
a main control board mounted on an inner side of the scale ruler main body;
an input coupled to the main control board;
a display screen coupled to the main control board;
a light source mounted on the outer edge side of the scale ruler main body, the light source comprising a plurality of light beads and being capable of displaying scale;
a vernier base removably mounted on the outer edge side of the scale ruler main body, the vernier base being capable of moving along a length direction of the outer edge side of the scale ruler main body; and
a distance conversion assembly coupled to the scale ruler main body, the distance conversion assembly being configured to calculate a movement of the vernier base from an origin on the outer edge side of the scale ruler main body;
wherein the main control board is configured to receive conversion instructions from the input, and determine an actual distance based on the conversion instructions and the movement of the vernier base from the origin on the outer edge side of the scale ruler main body.

2. The electronic scale ruler of claim 1, wherein the light source is a printed circuit board assembly (PCBA), and wherein the plurality of light beads are positioned in an arrayed manner along a direction of movement of the vernier base, wherein each of the plurality of light beads forms a single light bead scale line.

3. The electronic scale ruler of claim 2, wherein the plurality of light beads are selectively turned on in an array manner according to a turn-on instruction.

4. The electronic scale ruler of claim 2, further comprises a bottom board, the bottom board comprising a plurality of scale line light troughs and a plurality of fixed-point scale grooves, each of the plurality of fixed-point scale grooves corresponding to each of the plurality of scale line light troughs, each of the plurality of scale line light troughs corresponding to each of the light bead scale lines.

5. The electronic scale ruler of claim 1, wherein the light source is covered with at least one layer of brightening film along a length direction of the light source.

6. The electronic scale ruler of claim 1, wherein the distance conversion assembly comprises a guide rack, a moving grid assembly, and a gear assembly, the guide rack positioned along the length direction of the outer edge side of the scale ruler main body, the moving grid assembly having one end connected to an inner side of the gear assembly and a second end connected to the main control board.

7. The electronic scale ruler of claim 6, wherein the vernier base is mounted at an upper end of the gear assembly, and wherein the gear assembly is moved with the vernier base along the guide rack.

8. The electronic scale ruler of claim 6, wherein the gear assembly comprises a gear and a bearing, and wherein the moving grid assembly comprises a radial magnetizer, a magnetic encoder, and a moving grid line group, wherein the radial magnetizer is to convert a rotation angle of the gear into a radial magnetic field and wherein the magnetic encoder is to decode the radial magnetic field.

9. The electronic scale ruler of claim 1, wherein the scale ruler main body further comprises a key area and a battery.

10. The electronic scale ruler of claim 1, further comprises a pointer module coupled to the vernier base, the pointer module comprising a pointer and a prismatic lens, the prismatic lens configured to project a light at a front end of a light bead scale line formed by one of the plurality of light beads.

11. The electronic scale ruler of claim 1, further comprises a pencil cap coupled to the vernier base, the pencil cap adapted to receive a drawing tool.

12. The electronic scale ruler of claim 1, further comprises:
a fixed assembly coupled to a side of the scale ruler main body; and
a moving assembly to the scale ruler main body, the moving assembly having an upper moving clamping jaw and a lower moving clamping jaw capable of connecting to each other, the upper moving clamping jaw coupled to the vernier base.

13. The electronic scale ruler of claim 12, wherein the moving assembly is coupled to a sliding adjustment assembly in such a way that the moving assembly capable of moving along the length direction of the outer edge side of the scale ruler main body.

14. The electronic scale ruler of claim 13, wherein the moving assembly is coupled to a positioning assembly, the positioning assembly configured to fix the moving assembly at a position relative to the fixed assembly.

15. The electronic scale ruler of claim 13, wherein the sliding adjustment assembly comprises a thumb wheel, the thumb wheel configured to rotate and move along the length direction of the outer edge side of the scale ruler main body.

16. A method of determining an actual distance using an electronic scale ruler, the electronic scale ruler comprising an input area, a display screen, a plurality of light beads, a vernier base, and a main control board, the method comprising:

selecting a target unit size type from the input area;

selecting a scale from the input area;

sliding the vernier base from an origin to an end along a length direction of the electronic scale ruler;

recording a measured distance from the origin to the end;

calculating the actual distance, by the main control board, in accordance with the selected scale; and displaying the actual distance on the display screen.

17. The method of claim 16, further comprising:

selecting a total length and a division number;

calculating a unit length by dividing the total length by the division number; and determining a number of the plurality of light beads to be lit according to the unit length.

18. A method of determining an actual scale using an electronic scale ruler, the electronic scale ruler comprising an input area, a display screen, a plurality of light beads, a vernier base, and a main control board, the method comprising:

selecting a target unit size type from the input area;

sliding the vernier base from an origin to an end along a length direction of the electronic scale ruler;

recording a measured distance from the origin to the end;

obtaining an actual distance from the origin to the end;

determining an actual scale, by the main control board, by dividing the measure distance by the actual distance; and displaying the actual scale on the display screen.

* * * * *